Nov. 26, 1935.  S. A. SNELL  2,022,159
LEVER SHAFT CONSTRUCTION
Filed Sept. 24, 1930
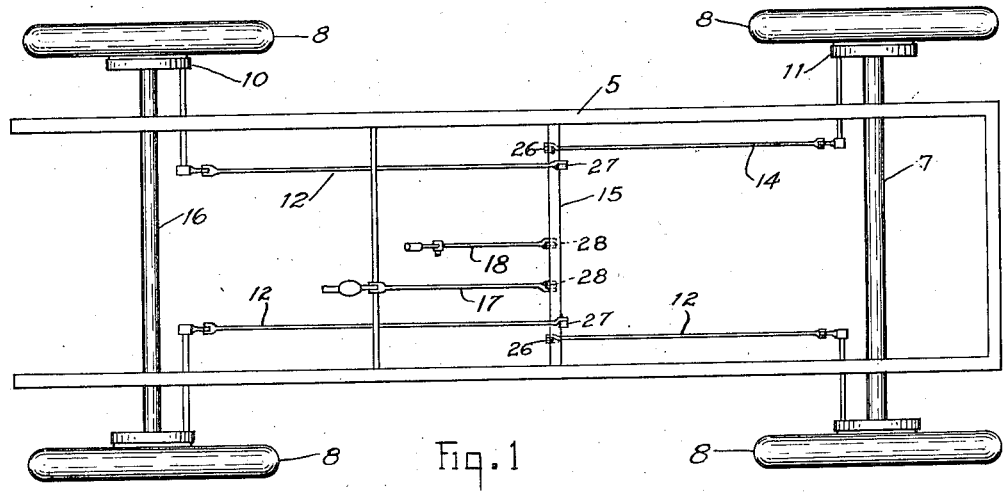
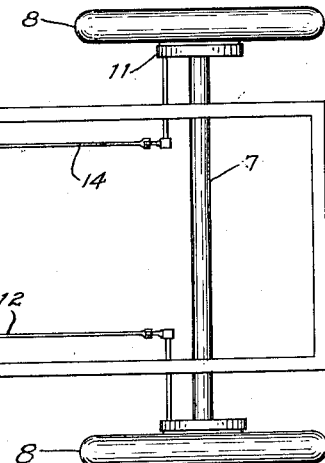
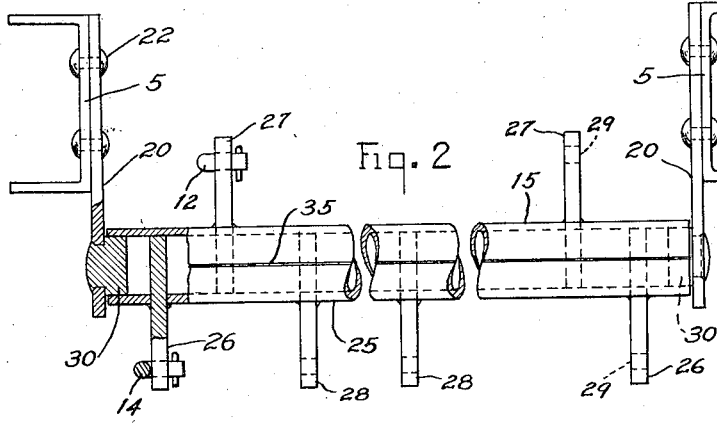
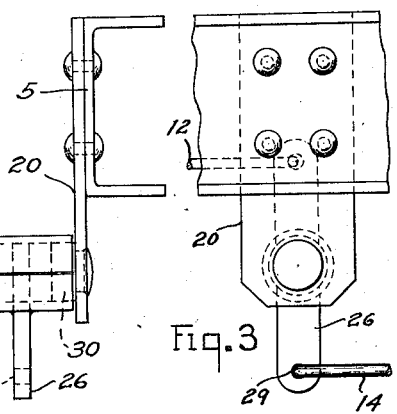
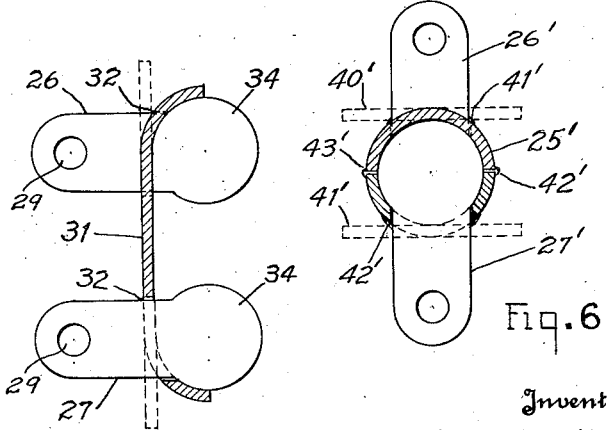
Inventor
Samuel A. Snell
By Braselton, Whitcomb Davies
Attorney Patented Nov. 26, 1935

2,022,159

UNITED STATES PATENT OFFICE 2,022,159

LEVER SHAFT CONSTRUCTION

Samuel A. Snell, Toledo, Ohio, assignor to The Bingham Stamping & Tool Company, Toledo, Ohio, a corporation of Ohio Application September 24, 1930, Serial No. 484,225

10 Claims. (Cl. 74—519)

This invention relates to a method and means for forming and shaping an element adapted to receive members to form a unitary construction and embraces a lever construction of the type particularly adapted for use in automotive vehicle construction.

The invention contemplates the method or means of producing a composite article wherein certain elements have portions adapted to be arranged within a hollow member whereby the same may be formed into a unitary structure.

The invention further embraces the provision of a lever construction composed of a tubular member and transversely arranged members having portions arranged within the tubular member, the resulting construction being very rigid and durable and not liable to breakdown in use.

A further object of the invention is the provision of a composite article of the character referred to wherein the parts are stamped and formed from sheet material thus materially decreasing the cost of the article.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a skeleton plane view of an automobile chassis incorporating the structure of my invention;

Figure 2 is a transverse sectional view through the frame showing the construction of my invention;

Figure 3 is an end view of the parts shown in Figure 2;

Figure 4 is a transverse sectional view showing one form of the device of my invention;

Figure 5 is an expanded view showing the method of assembling the parts of the device;

Figure 6 is a view showing a modified form of the arrangement of the device.

While I have shown the device of my invention as used as an element in a brake lever system for an automotive vehicle, it is to be understood that I contemplate the use of my device in any construction or constructions where the same may be applicable. The chassis with which I have shown my device comprises a skeleton framework 5 to which are secured the usual axles 6 and 7, wheels 8 and front and rear brakes 10 and 11 which are connected by means of suitable rods 12 and 14 to a transverse lever construction 15 of my invention. The transversely arranged lever 15 is connected by means of rods 17 and 18 to the service brake and the emergency brake operating means respectively.

Referring more particularly to Figure 2, the same illustrates the frame member 5 of the vehicle chassis to which is secured depending plates 10 20 which may be secured to the frame members by means of rivets 22 or other suitable means. The lever construction per se comprises a tubular member 25 having a plurality of transversely positioned arms 26, 27 and 28 which are held in place by means to be hereinafter described. The arms are provided adjacent their outer extremities with openings 29 to facilitate the connection of the brake operating rods thereto. The depending plates 20 are provided with short studs or arbors 30 which are riveted or otherwise secured thereto, said studs snugly fitting the inner bore of each end of the tubular member 25, thus serving as a pivotal support for the latter.

Applicant has devised a unique method and means of producing the lever construction formed with the tubular member 25 and the arms 26 which are now to be described. Referring particularly to Figure 5, a flat plate 31 as illustrated in the dotted lines in this figure is first formed up at the ends as illustrated and openings punched therein as indicated at 32 and the arms 26 and 27 inserted therein. The extremities of the arms are provided with enlarged circular portions 34 around which the flat plate 31 is folded or formed, and the finished or assembled lever construction being particularly illustrated in Figure 4.

From the foregoing, it will be apparent that the plate 31 when formed into the position shown in Figure 4 becomes a tube and the juncture of the edges of the tube are preferably welded as shown at 35, thus making an integral structure. If desired, the arms 26, 27 and 28 may be welded to the tube as shown at 36 to further enhance the strength of the structure. From the foregoing, it is obvious that applicant has devised a structure wherein the parts are held in fixed relation as the arms 26, 27 and 28 are not capable of movement independent of the tube and cannot be disengaged therefrom due to the enlarged portions 34 thereof snugly fitting the inner walls of the tubular member 25.

In the form of the device shown in Figure 6, the arms 26' and 27' are of the same construction as hereinbefore described while the tubular member 25' is fabricated of two separate flat plates 40' and 41' as illustrated in dotted lines. These plates are first formed to semi-annular contour and the openings 41' and 42' punched therein to receive the enlarged ends of the arms 26' and 27'. The juncture of the edges of the plates may be welded as at 42' and 43' thus producing an integral and rigid structure.

It is apparent that, within the scope of the invention modifications and different arrangements may be made other than is herein disclosed, and the present disclosure is illustrative merely, the invention comprehending all variations thereof.

What I claim is:

1. A lever construction comprising a tubular member; means for pivotally supporting said tubular member; an opening formed in the wall of said member; an arm formed of sheet material having a circular portion within and coincident with the inner wall of said tubular member, the projecting portion of said arm snugly fitting the walls of the opening in said tubular member.

2. An article of manufacture comprising a tubular member formed of a flat sheet of material, said tubular member having an opening in the side wall thereof; an element having an elongated portion passing through the opening in said tubular member, said element having a portion snugly fitting the inner wall of said tubular member whereby the parts are held in fixed relation.

3. An article of manufacture comprising a tubular member formed of a flat sheet of material, said tubular member having an opening in the side wall thereof; an element having an elongated portion passing through the opening in said tubular member and a circular portion snugly fitting the inner wall of said tubular member whereby the parts are held in fixed relation, the elongated portion of said element having an opening adjacent the end thereof.

4. In a device of the character disclosed, in combination, a member of sheet material; an element extending through an opening in a wall of said member, said member being formed to a predetermined hollow configuration surrounding a portion of the element whereby said element is maintained in position with respect to said member by fusion of portions of the walls of said member and element.

5. In a device of the character described, in combination, a member of sheet material; an element extending through an opening in a wall of said member, said member being formed to a predetermined configuration embracing a portion of the element whereby said element is fixedly maintained in position with respect to said member; said member being retained in the hollow configuration by welding.

6. In a device of the character described, in combination, a member of sheet material; an element extending through an opening in a wall of said member, said member being formed to a predetermined hollow configuration whereby said element is fixedly maintained in position with respect to said member, said member being maintained in hollow configuration by a welded joint.

7. In a device of the character described, in combination, a member of sheet material; an element extending through an opening in a wall of said member, said member being formed to a predetermined hollow configuration embracing a portion of said element, said element being welded to said member.

8. In a shaft for operating brakes and the like, the combination of a tube having a slot in the wall thereof, and a lever inserted in said slot having an enlarged portion within said tube in substantially co-extensive engagement with the perimeter of the inner surface thereof for locking said lever therein.

9. In a shaft for operating brakes and the like, the combination of a tube having a slot in the wall thereof, a disc fitting within said tube at the slot, and a reduced extension on said disc projecting through said slot to serve as a lever.

10. In a shaft for operating brakes and the like, the combination of a tube having a slot therein, a disc fitting in said tube and having a diameter greater than the width of the slot, and a reduced extension on said disc projecting through the slot and welded to said tube.

SAMUEL A. SNELL.